(12) United States Patent
Yang et al.

(10) Patent No.: US 7,061,780 B2
(45) Date of Patent: Jun. 13, 2006

(54) SWITCHING CONTROL CIRCUIT WITH VARIABLE SWITCHING FREQUENCY FOR PRIMARY-SIDE-CONTROLLED POWER CONVERTERS

(75) Inventors: Ta-yung Yang, Milpitas, CA (US); Guo-Kiang Hung, Sindian (TW); Jenn-yu G. Lin, Taipei (TW); Feng Cheng Tsao, Pingtung (TW); Chiu Shao Wei, Pingtung (TW)

(73) Assignee: System General Corp., Taipei Hsien (TW)

( * ) Notice: Subject to any disclaimer, the term of this patent is extended or adjusted under 35 U.S.C. 154(b) by 82 days.

(21) Appl. No.: 10/938,463

(22) Filed: Sep. 9, 2004

(65) Prior Publication Data

US 2006/0050539 A1    Mar. 9, 2006

(51) Int. Cl.
*H02M 3/335* (2006.01)
(52) U.S. Cl. .................................. 363/21.16; 363/21.13
(58) Field of Classification Search ............ 363/21.16, 363/21.13, 21.12, 40
See application file for complete search history.

(56) References Cited

U.S. PATENT DOCUMENTS 5,032,967 A * 7/1991 Marinus et al. .......... 363/21.13

* cited by examiner

*Primary Examiner*—Shawn Riley
(74) *Attorney, Agent, or Firm*—J.C. Patents

(57) ABSTRACT

The invention presents a switching control circuit for a primary-side-controlled power converter. A pattern generator produces a digital pattern to control a programmable capacitor that is connected to an oscillator, which produces frequency hopping to reduce the EMI. A voltage-waveform detector produces a voltage-feedback signal and a discharge-time signal by multi-sampling a voltage signal of a transformer. A current-waveform detector and an integrator generate a feedback signal. The integration of a current-waveform signal with a timing signal generates the average-current signal. Time constant of the integrator is correlated to the switching frequency. The oscillator generates the timing signal and a pulse signal in response to the output of a current-loop error amplifier. A PWM circuit generates the switching signal in response to the pulse signal and the output of a voltage-loop error amplifier for switching the switching device and regulating the output of the power converter.

15 Claims, 12 Drawing Sheets

SWITCHING CONTROL CIRCUIT WITH VARIABLE SWITCHING FREQUENCY FOR PRIMARY-SIDE-CONTROLLED POWER CONVERTERS

BACKGROUND OF THE INVENTION

1. Field of the Invention

The present invention relates to a control circuit for a power converter, and more specifically, to a switching control circuit for switching mode power converters.

2. Description of Related Art

Various power converters have been widely used to provide regulated voltage and current. For the sake of safety, an off-line power converter should provide galvanic isolation between its primary side and secondary side. When a control circuit is equipped at the primary side of the power converter, an optical-coupler and a secondary-side regulator are needed to regulate the output voltage and output current. The object of the present invention is to provide a switching control circuit for controlling the output voltage and the output current of a power converter at the primary side without using the optical-coupler and the secondary-side regulator. Furthermore, the technology of frequency hopping is introduced where the switching frequency of the switching signal is spread and thus the EMI (electric and magnetic interference) is lowered. Therefore the size and the cost of the power converter can be reduced.

SUMMARY OF THE INVENTION

A switching control circuit for a primary-side-control power converter comprises a switch for switching a transformer. A switching signal turns on the switch for regulating the output voltage and the maximum output current of the power converter. A controller is coupled to the transformer to generate a voltage-feedback signal and a discharge-time signal by multi-sampling a voltage signal and a discharge-time of the transformer during the off-time of the switching signal. The controller is further coupled to a current-sense device to generate a feedback signal in response to the discharge-time signal and a current signal of the transformer. Therefore, the controller generates a switching signal in response to the voltage-feedback signal. Besides, the controller controls the switching frequency of the switching signal in response to the feedback signal.

The controller comprises a voltage-waveform detector for multi-sampling a voltage signal and producing the voltage-feedback signal and the discharge-time signal. The voltage-waveform detector is connected to an auxiliary winding of the transformer through a divider. The discharge-time signal represents the discharge time of the transformer and also stands for the discharge time of a secondary-side switching current. An oscillator generates a pulse signal for determining the switching frequency of the switching signal. A current-waveform detector and an integrator produce the feedback signal by integrating an average-current signal with the discharge-time signal. The integrator integrates a current-waveform signal with the pulse width of a timing signal to generate the average-current signal. The current-waveform detector produces the current-waveform signal by measuring the current signal through the current-sense device.

A first operational amplifier and a first reference voltage develop a voltage-loop error amplifier to amplify the voltage-feedback signal and provide a loop gain for output voltage control. A second operational amplifier and a second reference voltage form a current-loop error amplifier to amplify the feedback signal and provide a loop gain for output current control. A peak-current limiter is coupled to the current-sense device to limit the maximum value of the current signal. A PWM circuit associates with comparators, which controls the pulse width of the switching signal in response to the output of the voltage-loop error amplifier and the output of the peak-current limiter. The output voltage is thus regulated. The output of the current-loop error amplifier is coupled to the oscillator to control the switching frequency of the switching signal. Therefore the output current of the power converter can be controlled.

A programmable current source is connected to the input of the voltage-waveform detector for temperature compensation. The programmable current source produces a programmable current in response to the temperature of the controller, which compensates the temperature deviation of the output voltage of the power converter. A pattern generator generates a digital pattern. A first programmable capacitor is coupled to the oscillator and the pattern generator to modulate the switching frequency in response to the digital pattern. A second programmable capacitor is coupled to the integrator and the pattern generator for correlating the time constant of the integrator with the switching frequency of the switching signal. The capacitance of the first programmable capacitor and the second programmable capacitor is controlled by the digital pattern.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE EMBODIMENTS

Figure 1:
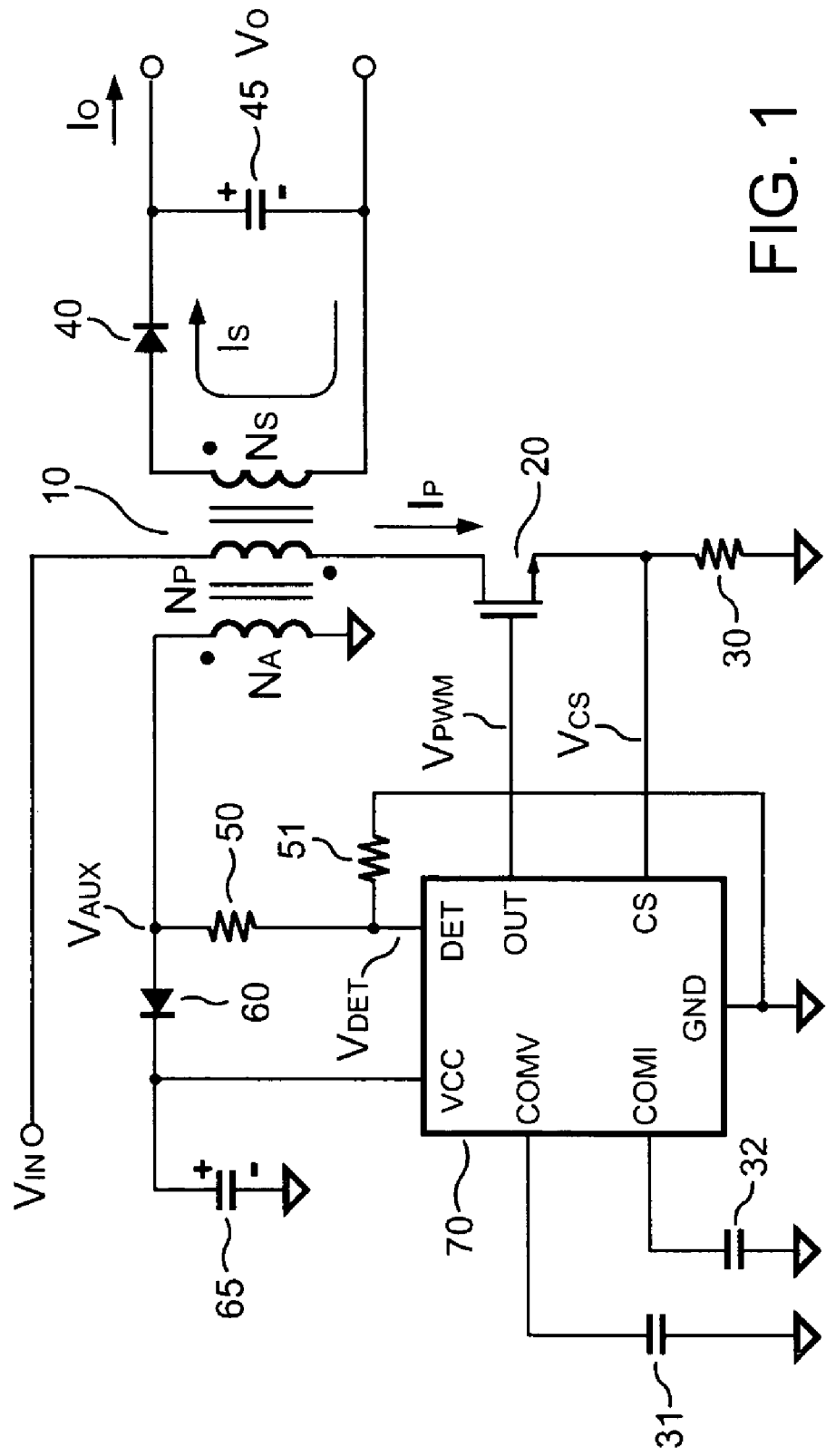
FIG. 1 shows a schematic diagram of a power converter having a switching control circuit.

FIG. 1 shows a power converter. The power converter includes a transformer 10 comprising an auxiliary winding NA, a primary winding $N_P$, and a secondary winding $N_S$. The primary winding $N_P$ is coupled to the input voltage $V_{IN}$ of the power converter. In order to regulate an output voltage $V_O$ and an output current $I_O$ of the power converter, a switching control circuit includes a switching signal $V_{PWM}$ to control a transistor 20 for switching the transformer 10. A current-sense resistor 30 serves as a current-sense device. A controller 70 generates the switching signal $V_{PWM}$.

Figure 2:
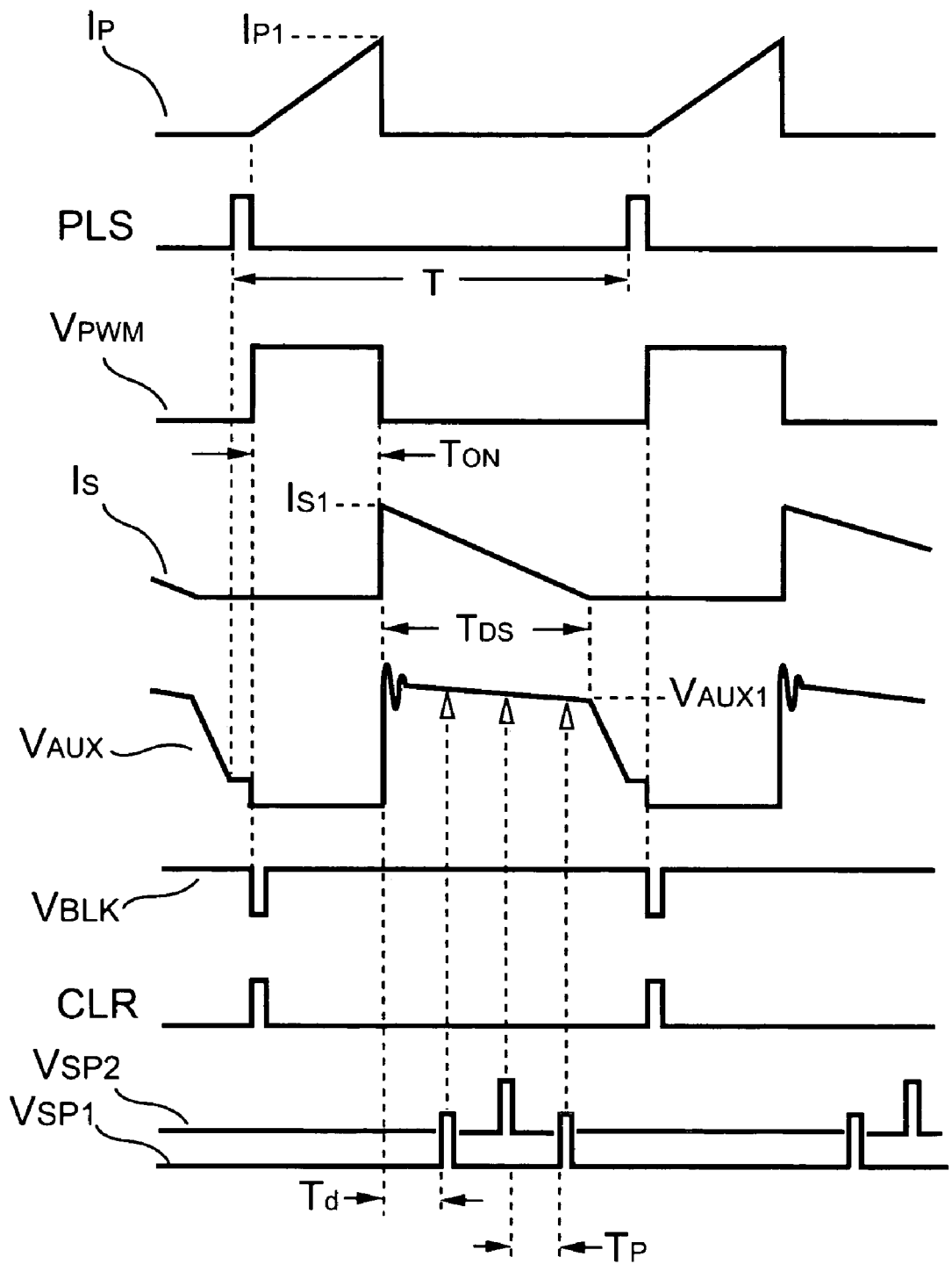
FIG. 2 shows key waveforms of the power converter and the switching control circuit.

FIG. 2 shows various signal waveforms of the power converter as shown in FIG. 1. As the switching signal $V_{PWM}$ becomes logic-high, a primary-side switching current $I_P$ will be generated accordingly. A primary-side switching peak current $I_{P1}$ can be given by, $$I_{P1} = \frac{V_{IN}}{L_P} \times T_{ON} \quad (1)$$

where $L_P$ is the inductance of the primary winding $N_P$ of the transformer 10; $T_{ON}$ is an on-time of the switching signal $V_{PWM}$.

Once the switching signal $V_{PWM}$ becomes logic-low, energy stored in the transformer 10 will be delivered to a secondary side of the transformer 10 and to an output of the power converter via a rectifier 40. A secondary-side switching current $I_S$ is generated accordingly. A secondary-side switching peak current $I_{S1}$ can be expressed by, $$I_{S1} = \frac{(V_O + V_F)}{L_S} \times T_{DS} \quad (2)$$

where $V_O$ is the output voltage of the power converter; VF is a forward voltage drop of the rectifier 40; $L_S$ is the inductance of the secondary winding $N_S$ of the transformer 10; $T_{DS}$ is a discharge time of the transformer 10, which also represents the discharge time of the secondary-side switching current Is.

Meanwhile, a voltage signal $V_{AUX}$ is generated at the auxiliary winding $N_A$ of the transformer 10. The voltage signal $V_{AUX1}$ is given by, $$V_{AUX1} = \frac{T_{NA}}{T_{NS}} \times (V_O + V_F) \quad (3)$$

where $T_{NA}$ and $T_{NS}$ are respectively the winding turns of the auxiliary winding $N_A$ and the secondary winding $N_S$ of the transformer 10.

The voltage signal $V_{AUX}$ will start to decrease as the secondary-side switching current $I_S$ drops to zero. This also indicates that energy of the transformer 10 is fully released at this moment. Therefore, as shown in FIG. 2, the discharge time $T_{DS}$ in equation (2) can be measured from the falling edge of the switching signal $V_{PWM}$ to the point that the voltage signal $V_{AUX}$ starts to decrease. The secondary-side switching peak current $I_{S1}$ is determined by the primary-side switching peak current $I_{P1}$ and the winding turns of the transformer 10. The secondary-side switching peak current $I_{S1}$ can be expressed by, $$I_{S1} = \frac{T_{NP}}{T_{NS}} \times I_{P1} \quad (4)$$

where $T_{NP}$ is the winding turns of the primary winding $N_P$ of the transformer 10.

The controller 70 includes a supply terminal VCC and a ground terminal GND for receiving power. A resistor 50 and a resistor 51 form a divider connected between the auxiliary winding $N_A$ of the transformer 10 and a ground reference level. A detection terminal DET of the controller 70 is connected to a joint of the resistor 50 and the resistor 51. A voltage $V_{DET}$ generated at the detection terminal DET is given by, $$V_{DET} = \frac{R_{51}}{R_{50} + R_{51}} \times V_{AUX} \quad (5)$$

where $R_{50}$ and $R_{51}$ are the resistance of the resistors 50 and 51.

The voltage signal $V_{AUX}$ further charges a capacitor 65 via a rectifier 60 for powering the controller 70. The current-sense resistor 30 is connected from a source of the transistor 20 to the ground reference level for converting the primary-side switching current $I_P$ into a current signal $V_{CS}$. A sense terminal CS of the controller 70 is connected to the current-sense resistor 30 for detecting the current signal $V_{CS}$.

An output terminal OUT of the controller 70 generates the switching signal $V_{PWM}$ for switching the transformer 10. A voltage-compensation terminal COMV is connected to a compensation network for voltage-loop frequency compensation. The compensation network can be a capacitor connected to the ground reference level, such as a capacitor 31. A current-compensation terminal COMI has another compensation network for current-loop frequency compensation. The compensation network can also be a capacitor connected to the ground reference level, such as a capacitor 32.

Figure 3:
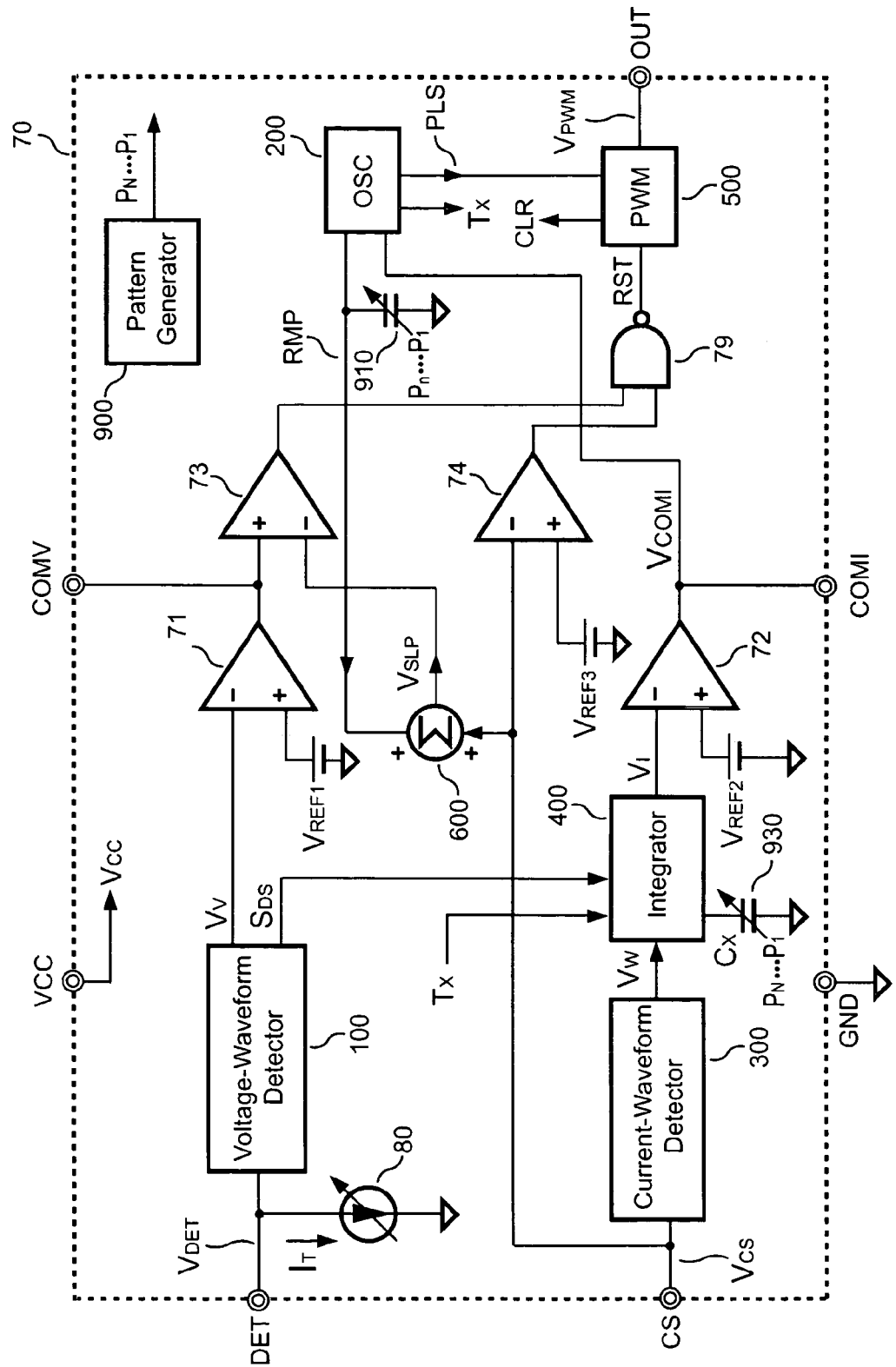
FIG. 3 shows one embodiment of a controller according to the present invention.

FIG. 3 shows one embodiment of the controller 70. A voltage-waveform detector 100 produces a voltage-feedback signal $V_V$ and a discharge-time signal $S_{DS}$ by multi-sampling the voltage $V_{DET}$. The discharge-time signal $S_{DS}$ represents the discharge time $T_{DS}$ of the secondary-side switching current $I_S$. A current-waveform detector 300 generates a current-waveform signal $V_W$ by measuring the current signal $V_{CS}$. An integrator 400 produces a feedback signal $V_1$ by integrating an average-current signal $V_{AV}$ with the discharge-time signal $S_{DS}$. The average-current signal is generated by the integration of the current-waveform signal $V_W$ and the pulse width of a timing signal $T_X$. An operational amplifier 71 and a reference voltage $V_{REF1}$ develop a voltage-loop error amplifier for amplifying the voltage-feedback signal $V_V$ and providing a loop gain for output voltage control. An operational amplifier 72 and a reference voltage $V_{REF2}$ develop a current-loop error amplifier for amplifying the feedback signal $V_1$ and providing a loop gain for output current control.

An oscillator 200 is coupled to an output of the current-loop error amplifier to generate a pulse signal PLS and the timing signal $T_X$. The pulse signal PLS is utilized to initiate the switching signal $V_{PWM}$ and determine a switching frequency of the switching signal $V_{PWM}$. The pulse width of the timing signal $T_X$ is correlated with the switching frequency of the switching signal $V_{PWM}$. A comparator 74 and a reference voltage $V_{REF3}$ develop a peak-current limiter to limit the primary-side switching peak current $I_{P1}$. An input of the peak-current limiter is coupled to the sense terminal CS to detect the current signal $V_{CS}$ and achieve cycle-by-cycle current limiting. A PWM circuit 500 is coupled to comparators 73 and 74 through a NAND gate 79 to control the pulse width of the switching signal $V_{PWM}$ in response to an output of the voltage-loop error amplifier and an output of the peak-current limiter.

Both operational amplifiers 71 and 72 have trans-conductance output. The output of the operational amplifier 71 is connected to the voltage-compensation terminal COMV and a positive input of the comparator 73. The output of the operational amplifier 72 is connected to the current-compensation terminal COMI. A negative input of the comparator 73 is connected to an output of an adder 600. The adder 600 generates a slope signal $V_{SLP}$ by adding the current signal $V_{CS}$ and a ramp signal RMP, which forms a slope compensation for voltage-loop.

A current control loop, formed from the detection of the primary-side switching current $I_P$ to the control of the switching frequency of the switching signal $V_{PWM}$, controls the average value of the secondary-side switching current $I_S$ in response to the reference voltage $V_{REF2}$. According to the signal waveforms in FIG. 2, the output current $I_O$ of the power converter is the average of the secondary-side switching current $I_S$. It can be expressed by, $$I_O = I_S \times \frac{T_{DS}}{2T} \quad (6)$$

where T is a switching period of the switching signal $V_{PWM}$ that correlates to a time constant of the oscillator 200. The output current $I_O$ of the power converter is therefore regulated.

The current-waveform detector 300 detects the current signal $V_{CS}$ and generates the current-waveform signal $V_W$. The integrator 400 further produces the feedback signal $V_1$ by integrating the average-current signal $V_{AV}$ with the discharge time $T_{DS}$. Integrating the current-waveform signal $V_W$ with the pulse width of the timing signal $T_X$ generates the average-current signal $V_{AV}$. The $V_1$ is thus designed as, $$V_1 = V_{AV} \times \frac{T_{DS}}{T_{I2}} \quad (7)$$

$$V_{AV} = \frac{V_W}{2} \times \frac{T_{XP}}{T_{I1}} \quad (8)$$

where the current-waveform signal $V_W$ is expressed by, $$V_W = \frac{T_{NS}}{T_{NP}} \times R_S \times I_{SI} \quad (9)$$

where $T_{11}$ and $T_{12}$ are the time constants of the integrator 400; A pulse width $T_{XP}$ of the timing signal $T_X$ is correlated with the switching period of the switching signal $V_{PWM}$; ($T_{XP}=\alpha T$).

It can be seen from equations (6)–(9) that the feedback signal $V_1$ can be rewritten as, $$V_1 = \frac{\alpha T^2}{T_{I1} \times T_{I2}} \times \frac{T_{NS}}{T_{NP}} \times R_S \times I_O \quad (10)$$

It can be found that the feedback signal $V_1$ is proportional to the output current $I_O$ of the power converter. The feedback signal $V_1$ is increased as the output current $I_O$ increases, but the maximum value of the feedback signal $V_1$ is limited to the value of the reference voltage $V_{REF2}$ through the regulation of the current control loop. Under feedback control of the current control loop, the switching frequency of the switching signal $V_{PWM}$ is reduced as a maximum output current $I_{O(max)}$ increases and vice versa. The maximum output current $I_{O(max)}$ is given by, $$I_{O(max)} = \frac{T_{NP}}{T_{NS}} \times \frac{G_A \times G_{SW} \times V_{REF2}}{1 + \left(G_A \times G_{SW} \times \frac{R_S}{K}\right)} \quad (11)$$

where K is a constant equal to $[(T_{11} \times T_{12})/(\alpha T^2)]$; $G_A$ is the gain of the current-loop error amplifier; $G_{SW}$ is the gain of the switching circuit.

When the loop gain of the current control loop is high ($G_A \times G_{SW} \gg 1$), the maximum output current $I_{O(max)}$ could be briefly defined as, $$I_{O(max)} = K \times \frac{T_{NP}}{T_{NS}} \times \frac{V_{REF2}}{R_S} \quad (12)$$

The maximum output current $I_{O(max)}$ of the power converter is thus regulated as a constant current in response to the reference voltage $V_{REF2}$.

Besides, voltage control loop is developed from the voltage signal $V_{AUX}$ sampling to the pulse width modulation of the switching signal $V_{PWM}$, which controls the magnitude of the voltage signal $V_{AUX}$ in response to the reference voltage $V_{REF1}$. The voltage signal $V_{AUX}$ is a ratio of the output voltage $V_O$ as shown in equation (3). The voltage signal $V_{AUX}$ is further attenuated to the voltage $V_{DET}$ as shown in equation (5). The voltage-waveform detector 100 generates the voltage-feedback signal $V_V$ by multi-sampling the voltage $V_{DET}$. The value of the voltage-feedback signal $V_V$ is controlled in response to the value of the reference voltage $V_{REF1}$ through the regulation of the voltage control loop. The voltage-loop error amplifier and the PWM circuit 500 provide the loop gain for the voltage control loop. Therefore the output voltage $V_O$ can be briefly defined as, $$V_O = \left(\frac{R_{50} + R_{51}}{R_{51}} \times \frac{T_{NS}}{T_{NA}} \times V_{REF1}\right) - V_F \quad (13)$$

The voltage signal $V_{AUX}$ is multi-sampled by the voltage-waveform detector 100. The voltage is sampled and measured instantly before the secondary-side switching current $I_S$ drops to zero. Therefore, the variation of the secondary-side switching current $I_S$ does not affect the value of the forward voltage drop VF of the rectifier 40. However, the forward voltage drop VF varies when the temperature changes. A programmable current source 80 is connected to an input of the voltage-waveform detector 100 for temperature compensation. The programmable current source 80 produces a programmable current $I_T$ in response to the temperature of the controller 70. The programmable current $I_T$ associates with the resistors 50, 51 to generate a voltage $V_T$ to compensate the temperature variation of the forward voltage drop $V_F$.

$$V_T = I_T \times \frac{R_{50} \times R_{51}}{R_{50} + R_{51}} \quad (14)$$

With reference to equations (12) and (13), we can find the ratio of resistors $R_{50}$ and $R_{51}$ determines the output voltage $V_O$. The resistance of resistors 50 and 51 determines the temperature coefficient for compensating the forward voltage drop $V_F$. Due to the programmable current source 80, the equation (12) can be rewritten as, $$V_O = \left(\frac{R_{50} + R_{51}}{R_{51}} \times \frac{T_{NS}}{T_{NA}}\right) \times (V_{REF1} + V_T) - V_F \quad (15)$$

Figure 4:
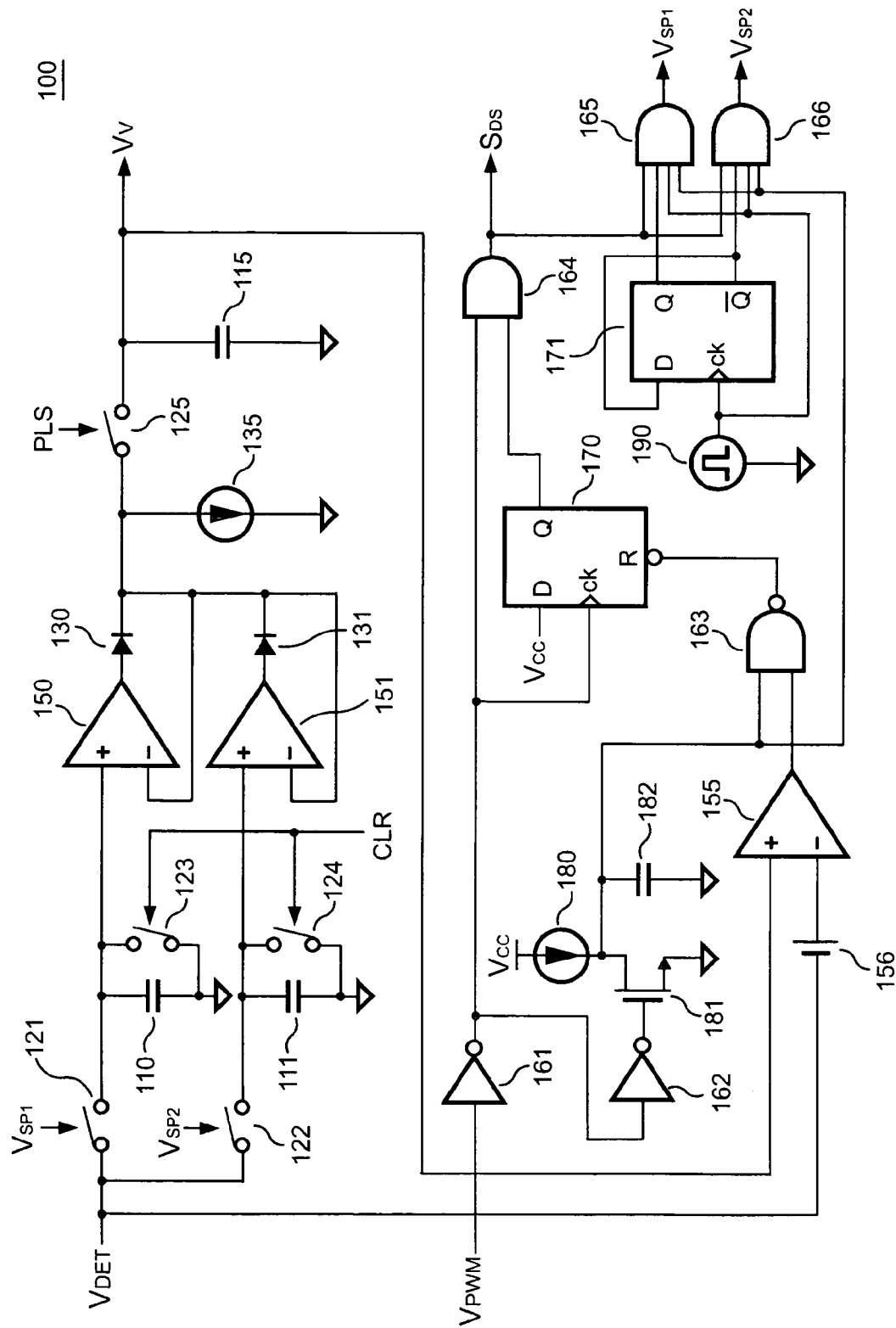
FIG. 4 shows one embodiment of a voltage-waveform detector according to the present invention.

FIG. 4 shows one embodiment of the voltage-waveform detector 100 according to the present invention. A sample-pulse generator 190 produces a sample-pulse signal for multi-sampling operation. A threshold signal 156 adds up the voltage signal $V_{AUX}$ to produce a level-shift reflected signal. A first signal generator includes a D flip-flop 171, two AND gates 165, 166 for producing a first sample signal $V_{SP1}$ and a second sample signal $V_{SP2}$. A second signal generator comprises a D flip-flop 170, a NAND gate 163, an AND gate 164 and a comparator 155 for producing the discharge-time signal $S_{DS}$. A time-delay circuit includes an inverter 162, a current source 180, a transistor 181 and a capacitor 182 for generating a delay time $T_d$ as the switching signal $V_{PWM}$ is disabled. An input of an inverter 161 is supplied with the switching signal $V_{PWM}$. An output of the inverter 161 is connected to an input of the inverter 162, a first input of the AND gate 164 and a clock-input of the D flip-flop 170. An output of the inverter 162 turns on/off the transistor 181. The capacitor 182 is connected in parallel with the transistor 181. The current source 180 is applied to charge the capacitor 182. Therefore the current of the current source 180 and the capacitance of the capacitor 182 decide the delay time $T_d$ of the time-delay circuit. The capacitor 182 is the output of the time-delay circuit. A D-input of the D flip-flop 170 is pulled high by a supply voltage $V_{CC}$. An output of the D flip-flop 170 is connected to a second input of the AND gate 164. The AND gate 164 outputs the discharge-time signal $S_{DS}$. The discharge-time signal $S_{DS}$ is thus enabled as the switching signal $V_{PWM}$ is disabled. The output of the NAND gate 163 is connected to a reset-input of the D flip-flop 170. The inputs of the NAND gate 163 are connected to the output of the time-delay circuit and an output of the comparator 155. A negative input of the comparator 155 is supplied with the level-shift reflected signal. A positive input of the comparator 155 is supplied with the voltage-feedback signal $V_V$. Therefore, after the delay time $T_d$, the discharge-time signal $S_{DS}$ can be disable once the level-shift reflected signal is lower than the voltage-feedback signal $V_V$. Besides, the discharge-time signal $S_{DS}$ can also be disabled as long as the switching signal $V_{PWM}$ is enabled.

The sample-pulse signal is applied to a clock-input of the D flip-flop 171 and third inputs of AND gates 165 and 166. A D-input and an inverse output of the D flip-flop 171 are connected together to form a divided-by-two counter. An output and the inverse output of the D flip-flop 171 are respectively connected to second inputs of AND gates 165 and 166. First inputs of AND gates 165 and 166 are supplied with the discharge-time signal $S_{DS}$. Fourth inputs of AND gates 165 and 166 are connected to the output of the time-delay circuit. Therefore the first sample signal $V_{SP1}$ and the second sample signal $V_{SP2}$ are generated in response to the sample-pulse signal. Besides, the first sample signal $V_{SP1}$ and the second sample signal $V_{SP2}$ are alternately produced during an enabled period of the discharge-time signal $S_{DS}$. However, the delay time $T_d$ is inserted at the beginning of the discharge-time signal $S_{DS}$ to inhibit the first sample signal $V_{SP1}$ and the second sample signal $V_{SP2}$. The first sample signal $V_{SP1}$ and the second sample signal $V_{SP2}$ are thus disabled during the period of the delay time $T_d$.

The first sample signal $V_{SP1}$ and the second sample signal $V_{SP2}$ are used for alternately sampling the voltage signal $V_{AUX}$ via the detection terminal DET and the divider. The first sample signal $V_{SP1}$ and the second sample signal $V_{SP2}$ control a switch 121 and a switch 122 for obtaining a first hold voltage and a second hold voltage across a capacitor 110 and a capacitor 111 respectively. A switch 123 is connected in parallel with the capacitor 110 to discharge the capacitor 110. A switch 124 is connected in parallel with the capacitor 111 to discharge the capacitor 111. A buffer amplifier includes operational amplifiers 150 and 151, diodes 130, 131, and a current source 135 for generating a hold voltage. The positive inputs of operational amplifiers 150 and 151 are respectively connected to the capacitor 110 and capacitor 111. The negative inputs of the operational amplifiers 150 and 151 are connected to an output of the buffer amplifier. The diode 130 is connected from an output of the operational amplifier 150 to the output of the buffer amplifier. The diode 131 is connected from an output of the operational amplifier 151 to the output of the buffer amplifier. The hold voltage is thus obtained from the higher voltage of the first hold voltage and the second hold voltage. The current source 135 is used for the termination. A switch 125 periodically samples the hold voltage to a capacitor 115 for producing the voltage-feedback signal $V_V$. The switch 125 is turned on/off by the pulse signal PLS. The first sample signal $V_{SP1}$ and the second sample signal $V_{SP2}$ start to produce the first hold voltage and the second hold voltage after the delay time $T_d$, which eliminates the spike interference of the voltage signal $V_{AUX}$. The spike of the voltage signal $V_{AUX}$ would be generated when the switching signal $V_{PWM}$ is disabled and the transistor 20 is turned off.

The voltage signal $V_{AUX}$ starts to decrease as the secondary-side switching current $I_S$ falls to zero, which will be detected by the comparator 155 for disabling the discharge-time signal $S_{DS}$. The pulse width of the discharge-time signal $S_{DS}$ is therefore correlated to the discharge time $T_{DS}$ of the secondary-side switching current $I_S$. Meanwhile the first sample signal $V_{SP1}$ and the second sample signal $V_{SP2}$ are disabled, and the multi-sampling operation is stopped as the discharge-time signal $S_{DS}$ is disabled. At the moment, the hold voltage generated at the output of the buffer amplifier represents an end voltage. The end voltage is thus correlated to the voltage signal $V_{AUX}$ that is sampled just before the secondary-side switching current $I_S$ dropping to zero. The hold voltage is obtained from the higher voltage of the first hold voltage and the second hold voltage, which will ignore the voltage that is sampled when the voltage signal starts to decrease.

Figure 5:
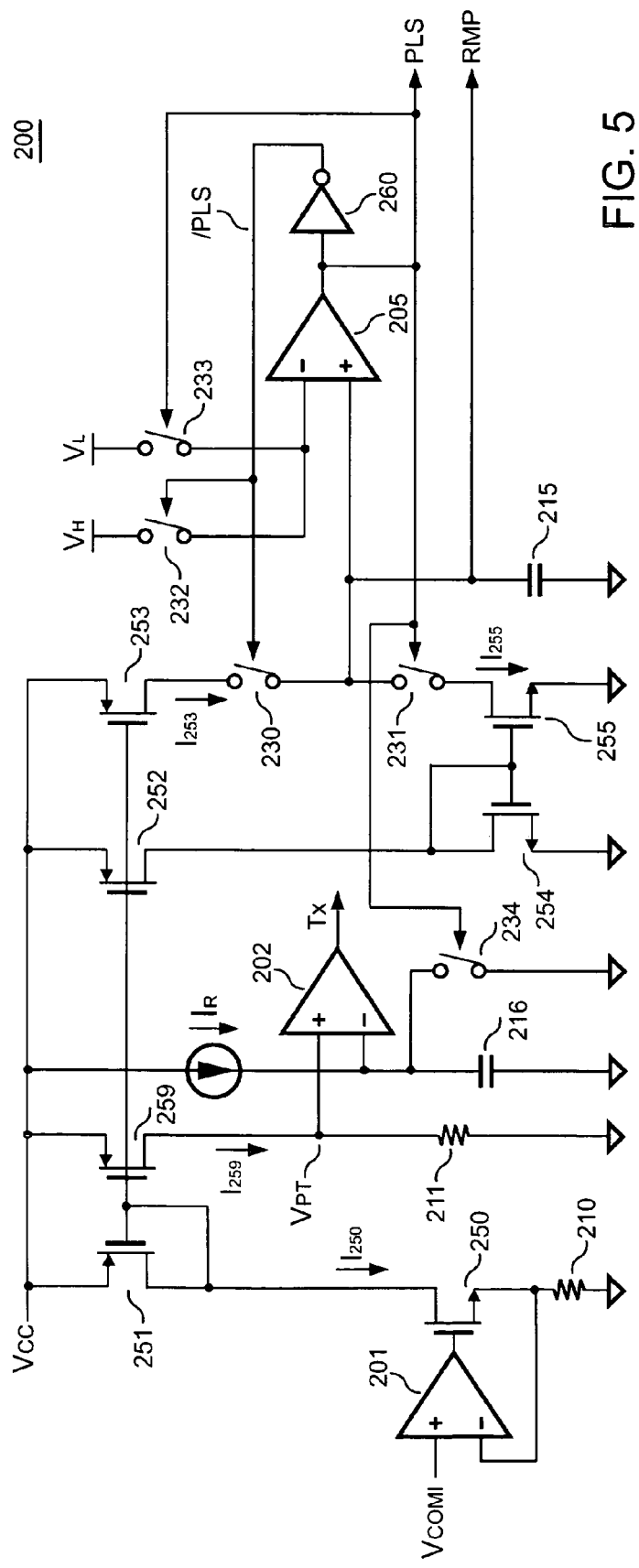
FIG. 5 shows one embodiment of an oscillator according to the present invention.

FIG. 5 shows one embodiment of the oscillator 200 according to the present invention. An operational amplifier 201, a resistor 210 and a transistor 250 consist a first V-to-I converter. The first V-to-I converter generates a reference current $I_{250}$ in response to the output voltage of the current-loop error amplifier $V_{COMI}$. Through the feedback loop control, the output voltage of the current-loop error amplifier $V_{COMI}$ will be regulated as the reference voltage $V_{REF2}$. A plurality of transistors, such as 251, 252, 253, 254, 255 and 259 form current mirrors for generating an oscillator charge current $I_{253}$, an oscillator discharge current $I_{255}$ and a timing current $I_{259}$ in response to the reference current $I_{250}$. A drain of the transistor 253 generates the oscillator charge current $I_{253}$. A drain of the transistor 255 generates the oscillator discharge current $I_{255}$. A drain of the transistor 259 generates the timing current $I_{259}$. A switch 230 is connected between the drain of the transistor 253 and a capacitor 215. A switch 231 is connected between the drain of the transistor 255 and the capacitor 215. The ramp signal RMP is obtained across the capacitor 215. A comparator 205 has a positive input connected to the capacitor 215. The comparator 205 outputs the pulse signal PLS. The pulse signal PLS determines the switching frequency. A first terminal of a switch 232 is supplied with a high threshold voltage $V_H$. A first terminal of a switch 233 is supplied with a low threshold voltage $V_L$. A second terminal of the switch 232 and a second terminal of the switch 233 are both connected to a negative input of the comparator 205. An inverter 260 receives the pulse signal PLS and produces an inverse pulse signal /PLS. The pulse signal PLS turns on/off the switch 231 and the switch 233. The inverse pulse signal /PLS turns on/off the switch 230 and the switch 232. A first programmable capacitor 910 as shown in FIG. 3 is connected in parallel with the capacitor 215 for modulating the switching frequency in response to a digital pattern $P_N \ldots P_1$. The resistance $R_{210}$ of the resistor 210, the capacitance $C_{215}$ of the capacitor 215 and the capacitance $C_{910}$ of the first programmable capacitor 910 determine the switching period T of the switching frequency, as shown in following equation:

$$T = \frac{(C_{215} + C_{910}) \times V_{OSC}}{V_{COMI}/R_{210}} = R_{210} \times (C_{215} + C_{910}) \times \frac{V_{OSC}}{V_{COMI}} \text{ where} \quad (16)$$

$$V_{OSC} = V_H - V_L.$$

The capacitance $C_{910}$ of the first programmable capacitor 910 varies in response to the variation of the digital pattern $P_N \ldots P_1$.

A resistor 211 and the timing current $I_{259}$ generate a trip-point voltage $V_{TP}$ across the resistor 211. The trip-point voltage $V_{TP}$ is supplied to a positive input of a comparator 202. A constant current source $I_R$ charges a capacitor 216. The capacitor 216 is connected to a negative input of the comparator 202. A switch 234 is connected in parallel with the capacitor 216 for discharging the capacitor 216. The switch 234 is turned on/off by the pulse signal PLS. The comparator 202 generates the timing signal $T_X$. The capacitor 216 is correlated with the capacitor 215. Therefore, the timing signal $T_X$ is correlated with the switching period T of the switching frequency.

Figure 6:
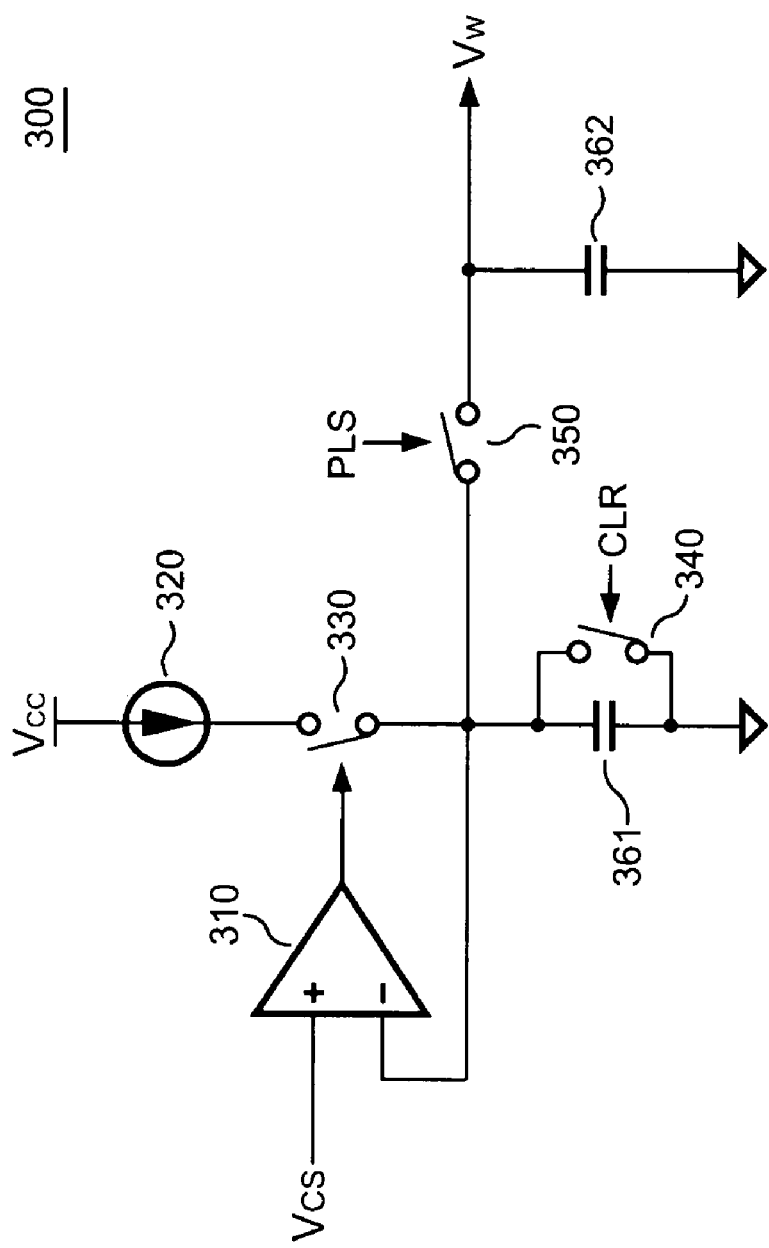
FIG. 6 shows one embodiment of a current-waveform detector according to the present invention.

FIG. 6 shows an embodiment of the current-waveform detector 300 according to the present invention. A peak detector includes a comparator 310, a current source 320, switches 330, 340, and a capacitor 361. The peak detector samples a peak value of the current signal $V_{CS}$ and generate a peak-current signal. A positive input of the comparator 310 is supplied with the current signal $V_{CS}$. A negative input of the comparator 310 is connected to the capacitor 361. The switch 330 is connected between the current source 320 and the capacitor 361. The output of the comparator 310 turns on/off the switch 330. The switch 340 is connected in parallel with the capacitor 361 for discharging the capacitor 361. A switch 350 periodically conducts the peak-current signal to a capacitor 362 for producing the current-waveform signal $V_W$. The switch 350 is turned on/off by the pulse signal PLS.

Figure 7:
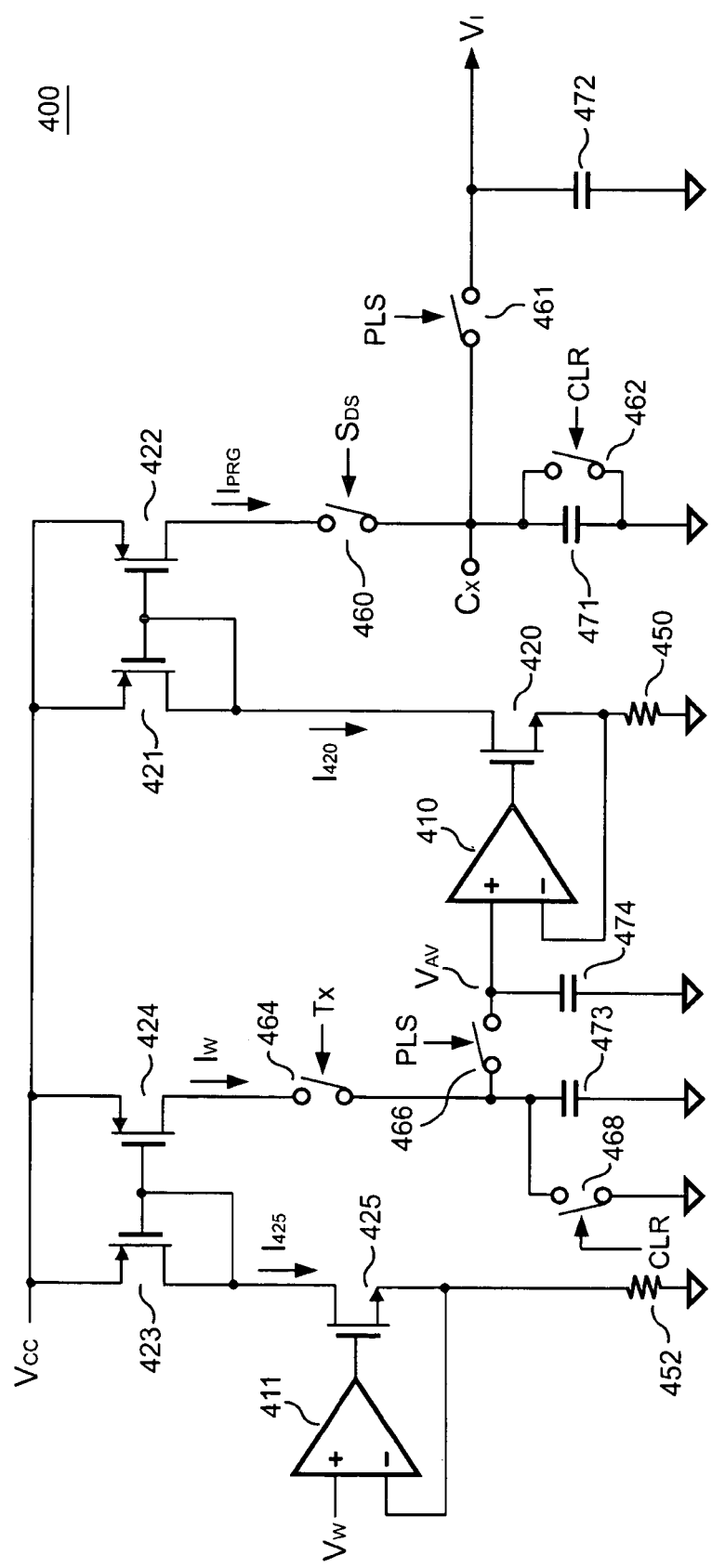
FIG. 7 shows one embodiment of an integrator according to the present invention.

FIG. 7 shows one embodiment of the integrator 400 according to the present invention. A third V-to-I converter comprises an operational amplifier 411, a resistor 452 and transistors 423, 424, and 425. A positive input of the operational amplifier 411 is supplied with the current-waveform signal $V_W$. A negative input of the operational amplifier 411 is connected to the resistor 452. An output of the operational amplifier 411 drives a gate of the transistor 425. A source of the transistor 425 is coupled to the resistor 452. The third V-to-I converter generates a current $I_{425}$ via a drain of the transistor 425 in response to the current-waveform signal $V_W$. Transistors 423 and 424 form a first current mirror having a 2:1 ratio. The first current mirror is driven by the current $I_{425}$ to produce a programmable charge current $I_W$ via a drain of the transistor 424. The programmable charge current $I_W$ can be expressed by, $$I_W = \frac{1}{R_{452}} \times \frac{V_W}{2} \quad (17)$$

where $R_{452}$ is the resistance of the resistor 452.

A capacitor 473 is used to produce a first integrated signal. A switch 464 is connected between the drain of the transistor 424 and the capacitor 473. The switch 464 is turned on/off by the timing signal $T_X$. A switch 468 is connected in parallel with the capacitor 473 for discharging the capacitor 473. A switch 466 periodically conducts the first-integrated signal to a capacitor 474 for producing the average-current signal $V_{AV}$. The pulse signal PLS turns on/off the switch 466. The average-current signal $V_{AV}$ is therefore obtained across the capacitor 474.

$$V_{AV} = \frac{1}{R_{452} \times C_{473}} \times \frac{V_W}{2} \times T_{XP} \quad (18)$$

A second V-to-I converter comprises an operational amplifier 410, a resistor 450 and transistors 420, 421, and 422. A positive input of the operational amplifier 410 is supplied with the average-current signal $V_{AV}$. A negative input of the operational amplifier 410 is connected to the resistor 450. An output of the operational amplifier 410 drives a gate of the transistor 420. A source of the transistor 420 is coupled to the resistor 450. The second V-to-I converter generates a current $I_{420}$ via a drain of the transistor 420 in response to the average-current signal $V_{AV}$. Transistors 421 and 422 form a second current mirror. The second current mirror is driven by the current $I_{420}$ to produce a programmable charge current $I_{PRG}$ via a drain of the transistor 422. The programmable charge current $I_{PRG}$ can be expressed by, $$I_{PRG} = \frac{V_{AV}}{R_{450}} \qquad (19)$$

where $R_{450}$ is the resistance of the resistor 450.

A capacitor 471 is used to produce an integrated signal. A switch 460 is connected between the drain of the transistor 422 and the capacitor 471. The switch 460 is turned on/off by the discharge-time signal $S_{DS}$. A switch 462 is connected in parallel with the capacitor 471 for discharging the capacitor 471. A second programmable capacitor 930 as shown in FIG. 3 is connected in parallel with the capacitor 471 at a $C_X$ terminal of the integrator 400 for correlating the time constant of the integrator 400 with the switching frequency. The capacitance $C_{930}$ of the second programmable capacitor 930 in response to the variation of the digital pattern $P_N \ldots P_1$. A switch 461 periodically conducts the integrated signal to a capacitor 472 for producing the feedback signal $V_1$. The pulse signal PLS turns on/off the switch 461. The feedback signal $V_1$ obtained across the capacitor 472 is given by, $$V_1 = \frac{V_{AV}}{R_{450} \times (C_{471} + C_{930})} \times T_{DS} \qquad (20)$$

According to the equations (4)–(9) and (16), the feedback signal $V_1$ is correlated to the secondary-side switching current $I_S$ and the output current $I_O$ of the power converter. Thus, the equation (10) can be rewritten as, $$V_1 = m \times \frac{T_{NS}}{T_{NP}} \times R_S \times I_O \qquad (21)$$

where m is a constant which can be determined by, $$m = \frac{\alpha \times [R_{210} \times (C_{215} + C_{910})]^2}{[R_{452} \times C_{473}] \times [R_{450} \times (C_{471} + C_{930})]} \times \frac{V_{OSC}}{V_{COMI}} \qquad (22)$$

The resistance $R_{450}$ and $R_{452}$ of the resistors 450, 452 are correlated to the resistance $R_{210}$ of the resistor 210. The capacitance $C_{471}$ and $C_{473}$ of the capacitors 471, 473 and the capacitance $C_{930}$ of the capacitor 930 are correlated to the capacitance $C_{215}$ of the capacitor 215 and the capacitance $C_{910}$ of the capacitor 910. Therefore, the feedback signal $V_1$ is proportional to the output current $I_O$ of the power converter.

Figure 8:
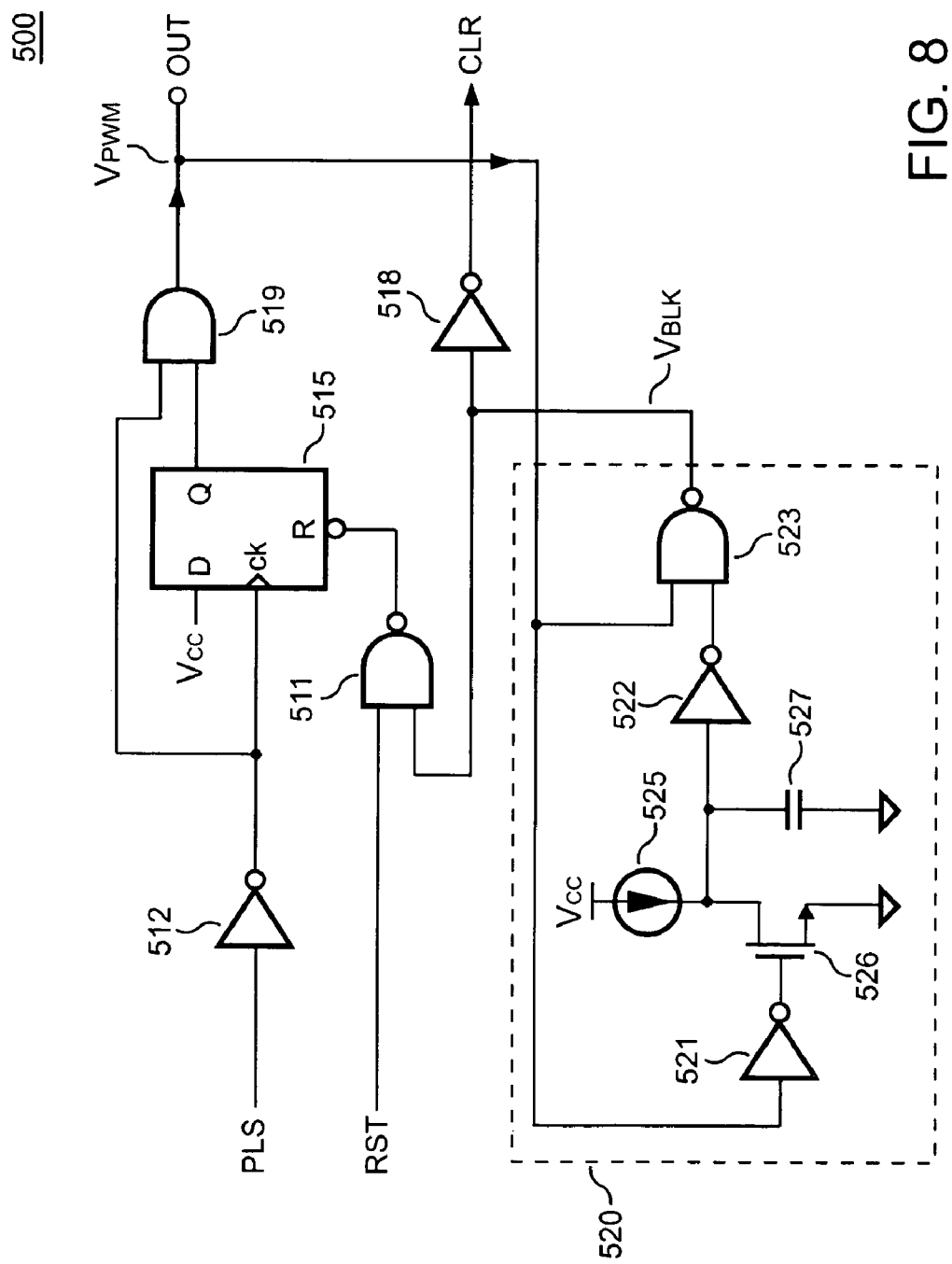
FIG. 8 shows a schematic diagram of a PWM circuit according to one embodiment of the present invention.

FIG. 8 shows a circuit schematic of the PWM circuit 500 according to an embodiment of the present invention. The PWM circuit 500 includes a NAND gate 511, a D flip-flop 515, an AND gate 519, a blanking circuit 520 and inverters 512, 518. A D-input of the D flip-flop 515 is pulled high with the supply voltage $V_{CC}$. The pulse signal PLS drives an input of the inverter 512. An output of the inverter 512 is connected to a clock-input of the D flip-flop 515 for enabling the switching signal $V_{PWM}$. An output of the D flip-flop 515 is connected to a first input of the AND gate 519. A second input of the AND gate 519 is coupled to the output of the inverter 512. The AND gate 519 outputs the switching signal $V_{PWM}$ to switch the power converter. A reset-input of the D flip-flop 515 is connected to an output of the NAND gate 511. A first input of the NAND gate 511 is supplied with the reset signal RST for cycle-by-cycle disabling the switching signal $V_{PWM}$. The second input of the NAND gate 511 is connected to an output of the blanking circuit 520 for ensuring a minimum on-time of the switching signal $V_{PWM}$ once the switching signal $V_{PWM}$ is enabled. The minimum on-time of the switching signal $V_{PWM}$ ensures a minimum discharge-time $T_{DS}$, which ensures a proper multi-sampling operation for voltage signal $V_{AUX}$ in the voltage-waveform detector 100. The discharge time $T_{DS}$ is related to the on-time $T_{ON}$ of the switching signal $V_{PWM}$. With reference to equations (1), (2), (4), and (23), the discharge-time $T_{DS}$ can be expressed as equation (24) shows, $$L_S = \left(\frac{T_{NS}}{T_{NP}}\right)^2 \times L_P \qquad (23)$$

$$T_{DS} = \left(\frac{V_{IN}}{V_O + V_F}\right) \times \frac{T_{NS}}{T_{NP}} \times T_{ON} \qquad (24)$$

An input of the blanking circuit 520 is supplied with the switching signal $V_{PWM}$. When the switching signal $V_{PWM}$ is enabled, the blanking circuit 520 generates a blanking signal $V_{BLK}$ to inhibit the reset of the D flip-flop 515. The blanking circuit 520 further comprises a NAND gate 523, a current source 525, a capacitor 527, a transistor 526 and inverters 521, 522. The switching signal $V_{PWM}$ is supplied to an input of the inverter 521 and the first input of the NAND gate 523. The current source 525 is applied to charge the capacitor 527. The capacitor 527 is connected between a drain and a source of the transistor 526. The output of the inverter 521 turns on/off the transistor 526. An input of the inverter 522 is coupled to the capacitor 527. An output of the inverter 522 is connected to a second input of the NAND gate 523. An output of the NAND gate 523 outputs the blanking signal $V_{BLK}$. The current of the current source 525 and the capacitance of the capacitor 527 determine the pulse width of the blanking signal $V_{BLK}$. An input of an inverter 518 is connected to the output of the NAND gate 523. An output of the inverter 518 generates a clear signal CLR to turn on/off switches 123, 124, 340 462 and 468.

Figure 9:
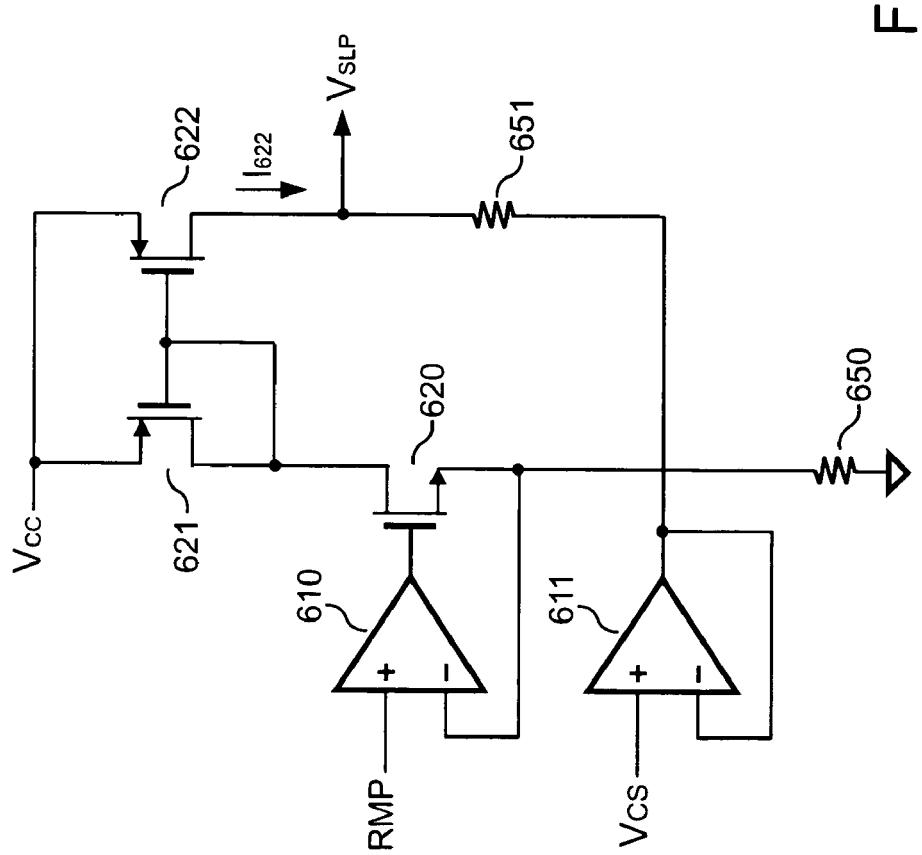
FIG. 9 shows a schematic diagram of an adder according to the present invention.

FIG. 9 shows a schematic diagram of the adder 600 according to the present invention. An operational amplifier 610, transistors 620, 621, 622 and a resistor 650 develop a fourth V-to-I converter for generating a current $I_{622}$ in response to the ramp signal RMP. A positive input of an operational amplifier 611 is supplied with the current signal $V_{CS}$. A negative input and an output of the operational amplifier 611 are connected together to build the operational amplifier 611 as a buffer. A drain of the transistor 622 is connected to the output of the operational amplifier 611 via a resistor 651. The slope signal $V_{SLP}$ is generated at the drain of the transistor 622. The slope signal $V_{SLP}$ is therefore correlated to the ramp signal RMP and the current signal $V_{CS}$.

Figure 10:
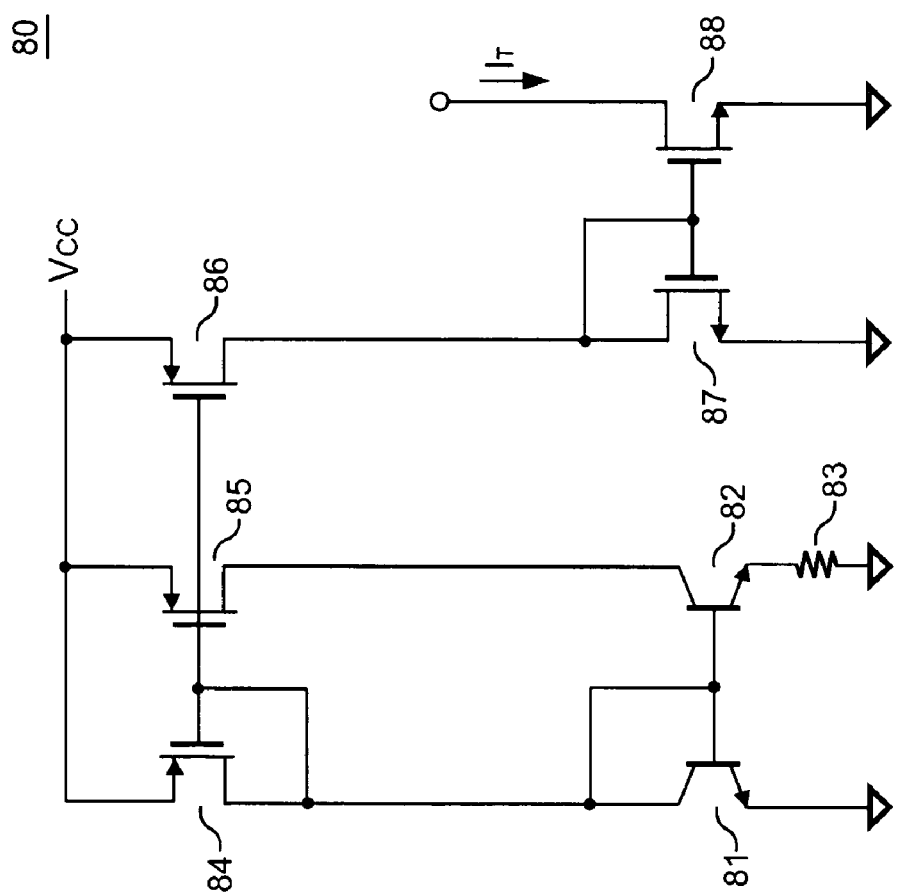
FIG. 10 shows a schematic diagram of a programmable current source according to one embodiment of the present invention.

FIG. 10 shows a schematic diagram of the programmable current source 80 that generates the programmable current $I_T$ in response to temperature variation. The programmable current generator 80 comprises two bipolar transistors 81 and 82, three p-mirror transistors 84, 85, and 86, two n-mirror transistors 87 and 88 and a resistor 83. The programmable current $I_T$ is given by, $$I_T = N_M \times \frac{k \times T_{emp}}{q} \times \frac{\ln(r)}{R_T} \quad (25)$$

where $R_T$ is the resistance of resistor 83; $N_M = M_1 \times M_2$; $M_1$ is the geometrical ratio of the transistor 85 and 86; $M_2$ is the geometrical ratio of the transistor 87 and 88; k is the Boltzmann's constant; q is the charge on an electron; r is the emitter area ratio of the bipolar transistor 81 and 82; and $T_{emp}$ is the transistor temperature.

Furthermore, in order to produce a frequency hopping for reducing the EMI of the power converter, a pattern generator 900 generates the digital pattern $P_N \ldots P_1$. The first programmable capacitor 910 is coupled to the oscillator 200 and the pattern generator 900 for modulating the switching frequency of the switching signal $V_{PWM}$ in response to the digital pattern $P_N \ldots P_1$. The second programmable capacitor 930 is coupled to the integrator 400 and the pattern generator 900 for correlating the time constant of the integrator 400 with the switching frequency. The capacitance of the first programmable capacitor 910 and the second programmable capacitor 930 is determined by the digital pattern $P_N \ldots P_1$.

Figure 11:
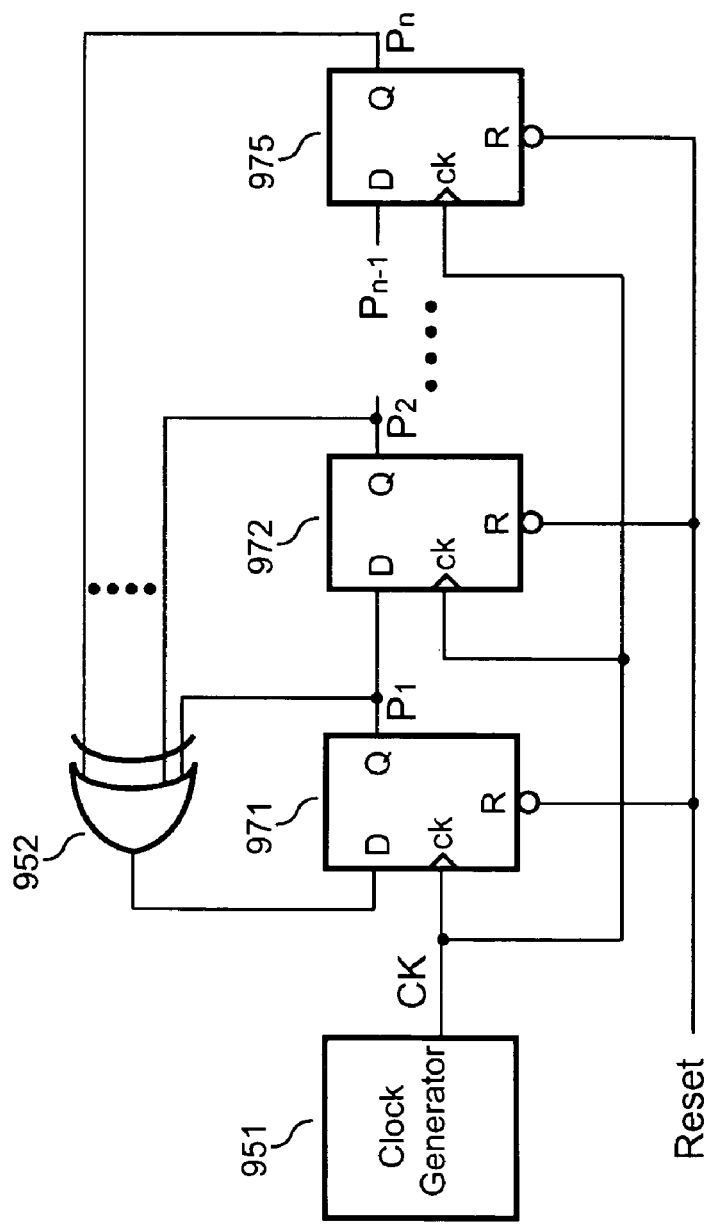
FIG. 11 shows a pattern generator according to one embodiment of the present invention.

FIG. 11 shows one embodiment of the pattern generator 900 according to the present invention. A clock generator 951 generates a clock signal CK. A plurality of registers 971, 972 . . . 975 and a XOR gate 952 develop a linear shift register for generating a linear code in response to the clock signal CK. The inputs of the XOR gate 952 determine the polynomials of the linear shift register and decide the output of the linear shift register. The digital pattern code $P_N \ldots P_1$ can be adopted from the part of the linear code to optimize the application.

Figure 12:
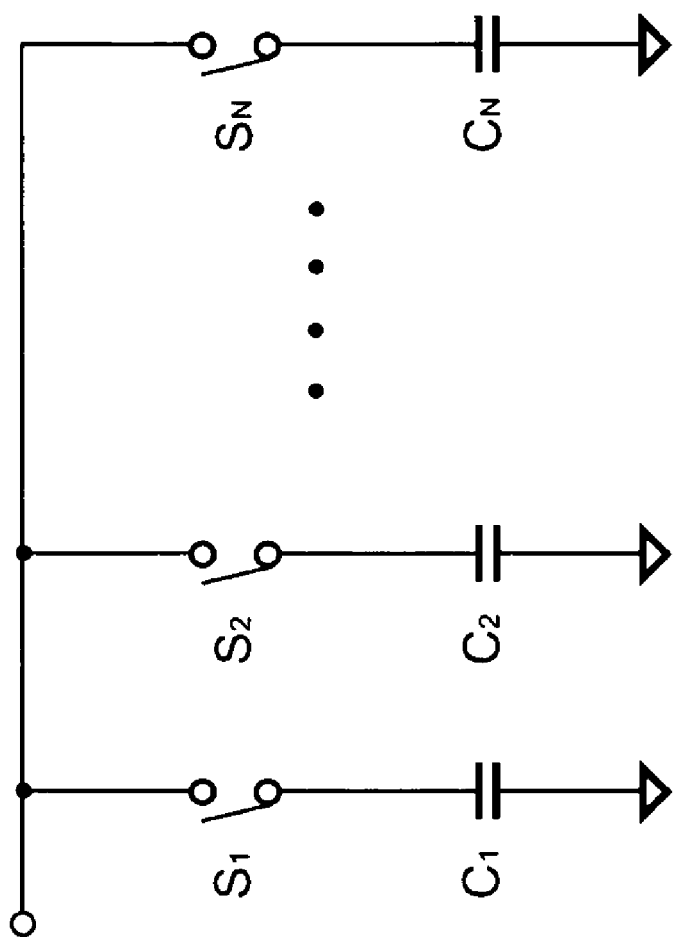
FIG. 12 shows a programmable capacitor according to one embodiment of the present invention.

FIG. 12 shows an embodiment of the programmable capacitor such as the first programmable capacitor 910 and the second programmable capacitor 930. The programmable capacitor comprises switching-capacitor sets connected in parallel, in which the switching-capacitor sets are formed by capacitors $C_1, C_2, \ldots, C_N$ and switches $S_1, S_2, \ldots S_N$. The switch $S_1$ and the capacitor $C_1$ are connected in series. The switch $S_2$ and the capacitor $C_2$ are connected in series. The switch $S_N$ and the capacitor $C_N$ are connected in series. The digital pattern code $P_N \ldots P_1$ controls switches $S_1, S_2, \ldots S_N$, and therefore varies the capacitance of the programmable capacitor.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching control circuit for a primary-side-controlled power converter, comprising:
   a switch for switching a transformer; wherein said transformer is coupled to an input voltage of the power converter;
   a sense device, which is coupled to said transformer for sensing current or/and voltage of said transformer;
   a switching signal, coupled to said switch for regulating an output voltage and a maximum output current of the power converter; and
   a controller, coupled to said transformer to generate a first feedback signal and a discharge-time signal by multi-sampling a voltage signal and a discharge time of said transformer during an off-time of said switching signal, said controller further coupled to said sense device to generate a second feedback signal in response to said discharge-time signal and a current signal of said transformer, wherein said controller generates said switching signal in response to said first feedback signal, said controller controlling a switching frequency of said switching signal in response to said second feedback signal.

2. The switching control circuit as claimed in claim 1, wherein said controller comprising:
   a first waveform detector, coupled to said transformer for producing said first feedback signal and said discharge-time signal by multi-sampling said voltage signal from an auxiliary winding of said transformer; wherein said discharge-time signal corresponds to said discharge time of a secondary-side switching current of said transformer;
   a second waveform detector and an integrator, producing said second feedback signal by integrating an average-current signal with said discharge-time signal, wherein a current-waveform signal integrated with the pulse width of a timing signal generate said average-current signal; said current-waveform signal is produced by measuring said current signal;
   a first error amplifier and a second error amplifier, for amplifying said first feedback signal and said second feedback signal respectively;
   an oscillator, coupled to said second error amplifier, generating a pulse signal and said timing signal in response to an output of said second error amplifier, wherein said pulse signal determines the switching frequency of said switching signal; wherein the pulse width of said timing signal is correlated with the switching frequency of said switching signal;
   a peak-current limiter, coupled to said sense device to limit the maximum value of said current signal; and
   a PWM circuit, generating said switching signal in response to said pulse signal, an output of said first error amplifier and an output of said peak-current limiter.

3. The switching control circuit as claimed in claim 2, wherein said controller further comprising:
   a programmable current source, connected to an input of said first waveform detector for temperature compensation; wherein said programmable current source produces a programmable current in response to the temperature of said controller.

4. The switching control circuit as claimed in claim 2, wherein said controller further comprising:
   a pattern generator, for generating a digital pattern;
   a first programmable capacitor, coupled to said oscillator and said pattern generator for modulating said switching frequency in response to said digital pattern; and
   a second programmable capacitor, coupled to said integrator and said pattern generator for correlating the time constant of said integrator with said switching frequency; wherein the capacitance of said first programmable capacitor and said second programmable capacitor is determined by said digital pattern.

5. The switching control circuit as claimed in claim 2, wherein the time constant of said integrator is correlated with the switching period of said switching signal.

6. The switching control circuit as claimed in claim 2, wherein said first waveform detector comprises:
- a sample-pulse generator, for producing a sample-pulse signal;
- a threshold signal, wherein said threshold signal adds said voltage signal to produce a level-shift signal;
- a first capacitor and a second capacitor;
- a first signal generator, producing a first sample signal and a second sample signal, wherein said first sample signal and said second sample signal are used for alternately sampling said voltage signal, wherein a first hold voltage and a second hold voltage are respectively held across said first capacitor and said second capacitor; wherein said first sample signal and said second sample signal are alternately generated in response to said sample-pulse signal during an enabled period of said discharge-time signal; wherein a delay time is inserted at the beginning of said discharge-time signal, wherein said first sample signal and said second sample signal are disabled during the period of said delay time;
- a buffer amplifier, generating a hold signal from the higher voltage of said first hold voltage and said second hold voltage;
- a first output capacitor, producing said first feedback signal by sampling said hold signal; and
- a second signal generator, producing said discharge-time signal; wherein said discharge-time signal is enabled as said switching signal is disabled; wherein after said delay time, said discharge-time signal can be disabled once said level-shift signal is lower than said first feedback signal; wherein said discharge-time signal can also be disabled as long as said switching signal is enabled.

7. The switching control circuit as claimed in claim 2, wherein said first waveform detector multi-samples said voltage signal to generate an end voltage for producing said first feedback signal; wherein said end voltage is sampled and measured instantly before said secondary-side switching current drops to zero.

8. The switching control circuit as claimed in claim 4, wherein said pattern generator comprises:
- a clock generator, for producing a clock signal; and
- a register, for generating said digital pattern in response to said clock signal.

9. The switching control circuit as claimed in claim 2, wherein said oscillator comprises:
- a first V-to-I converter, for generating a first charge current, a discharge current and a second charge current in response to said output of said second error amplifier; wherein said first V-to-I converter includes a first operational amplifier, a first oscillator resistor and a first group of transistors;
- a first oscillator capacitor;
- a first switch, wherein a first terminal of said first switch is supplied with said first charge current and a second terminal of said first switch is connected to said first oscillator capacitor;
- a second switch, wherein a first terminal of said second switch is connected to said first oscillator capacitor and a second terminal of said second switch is driven by said discharge current;
- a first comparator, having a non-inverting input connected to said first oscillator capacitor, wherein said first comparator generates said pulse signal;
- a third switch, having a first terminal supplied with a high threshold voltage and a second terminal connected to an inverting input of said first comparator;
- a fourth switch, having a first terminal supplied with a low threshold voltage and a second terminal connected to said inverting input of said first comparator;
- an inverter, having an input connected to an output of said first comparator for producing an inverse pulse signal; wherein said pulse signal turns on/off said second switch and said fourth switch, wherein said inverse pulse signal turns on/off said first switch and said third switch;
- a third resistor, generating a trip-point voltage in response to said second charge current;
- a second oscillator capacitor;
- a fifth switch connected in parallel with said second oscillator capacitor;
- a second comparator, having an inverting input connected to said second oscillator capacitor, a non-inverting input supplied with said trip-point voltage, wherein said second comparator generates said timing signal.

10. The switching control circuit as claimed in claim 2, wherein said second waveform detector comprises:
- a peak detector, generating a peak-current signal by measuring a peak value of said current signal;
- a third capacitor, holding said peak-current signal;
- a second output capacitor, producing said current-waveform; and
- a switch, for conducting said peak-current signal to said second output capacitor.

11. The switching control circuit as claimed in claim 2, wherein said integrator comprises:
- a first V-to-I converter, formed by a first operational amplifier, a first timing resistor and a first group of transistors, wherein said first V-to-I converter generates a first integrator charge current in response to said current-waveform signal;
- a first timing capacitor, for producing a first integrated signal;
- a first switch, wherein a first terminal of said first switch is supplied with said first integrator charge current and a second terminal of said first switch is connected to said first timing capacitor; wherein said timing signal turns on/off said first switch;
- a second switch, connected in parallel with said first timing capacitor for discharging said first timing capacitor;
- a third switch;
- a second output capacitor, producing an average-current signal by sampling said first integrated signal through said third switch;
- a second V-to-I converter, formed by a second operational amplifier, a second timing resistor and a second group of transistors, wherein said second V-to-I converter generates a second integrator charge current in response to said average-current signal;
- a third timing capacitor, for producing a second integrated signal;
- a fourth switch, wherein a first terminal of said fourth switch is supplied with said second integrator charge current and a second terminal of said fourth switch is connected to said third timing capacitor; wherein said discharge-time signal turns on/off said fourth switch;
- a fifth switch, connected in parallel with said third timing capacitor for discharging said third timing capacitor;
- a sixth switch; and a fourth output capacitor, producing said second feedback signal by sampling said second integrated signal through said sixth switch.

12. The switching control circuit as claimed in claim 1, wherein said switching signal having a minimum on-time once said switching signal is enabled, which further ensures a minimum value of said discharge time for multi-sampling said voltage signal.

13. A switching control circuit for a primary-side-controlled power converter, comprising:
- a switch for switching a transformer; in which said transformer is coupled to an input voltage of the power converter;
- a switching signal coupled to said switch for regulating said output voltage; and
- a controller coupled to said transformer to generate a first feedback signal by multi-sampling a voltage signal and a discharge time of said transformer during an off-time of said switching signal, wherein said controller generates said switching signal in response to said first feedback signal, wherein said controller comprises a first waveform detector.

14. The switching control circuit as claimed in claim 13, wherein said first waveform detector comprising:
- a sample-pulse generator, for producing a sample-pulse signal;
- a threshold signal, wherein said threshold signal adds said voltage signal producing a level-shift signal;
- a first capacitor and a second capacitor;
- a first signal generator, producing a first sample signal and a second sample signal, wherein said first sample signal and said second sample signal are used for alternately sampling said voltage signal, wherein a first hold voltage and a second hold voltage are respectively held across said first capacitor and said second capacitor, wherein said first sample signal and said second sample signal are alternately generated in response to said sample-pulse signal during an enabled period of a discharge-time signal, wherein a delay time is inserted at the beginning of said discharge-time signal, wherein said first sample signal and said second sample signal are disabled during the period of said delay time;
- a buffer amplifier, generating a hold signal from the higher voltage of said first hold voltage and said second hold voltage;
- a first output capacitor, producing said first feedback signal by sampling said hold signal;
- a second signal generator, producing said discharge-time signal; wherein said discharge-time signal is enabled as said switching signal is disabled, wherein after said delay time, said discharge-time signal can be disabled once said level-shift signal is lower than said first feedback signal, wherein said discharge-time signal can also be disabled as long as said switching signal is enabled; said discharge-time signal is generated in accordance with said discharge time of said transformer.

15. The switching control circuit as claimed in claim 13, wherein said first waveform detector multi-sampling said voltage signal to generate an end voltage for producing said first feedback signal; wherein said end voltage is sampled and measured instantly before a secondary-side switching current drops to zero.

* * * * *